US009676987B2

(12) United States Patent
Pober

(10) Patent No.: US 9,676,987 B2
(45) Date of Patent: Jun. 13, 2017

(54) WATER-SOLUBLE LINEAR POLYPHOSPHAZENES IN WATER-BASED FLUIDS FOR USE IN WELLS OR PIPELINES

(71) Applicant: Halliburton Energy Services, Inc., Houston, TX (US)

(72) Inventor: Kenneth William Pober, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 15/028,108

(22) PCT Filed: Apr. 9, 2014

(86) PCT No.: PCT/US2014/033544
§ 371 (c)(1),
(2) Date: Apr. 8, 2016

(87) PCT Pub. No.: WO2015/156800
PCT Pub. Date: Oct. 15, 2015

(65) Prior Publication Data
US 2016/0251560 A1    Sep. 1, 2016

(51) Int. Cl.
*C09K 8/54*        (2006.01)
*C09K 8/12*        (2006.01)
*C09K 8/035*       (2006.01)
*C09K 8/68*        (2006.01)
*C09K 8/88*        (2006.01)
*E21B 33/068*      (2006.01)
*E21B 43/26*       (2006.01)
*E21B 43/267*      (2006.01)
*E21B 21/00*       (2006.01)
*E21B 43/04*       (2006.01)
*E21B 43/16*       (2006.01)

(52) U.S. Cl.
CPC .............. *C09K 8/12* (2013.01); *C09K 8/035* (2013.01); *C09K 8/54* (2013.01); *C09K 8/68* (2013.01); *C09K 8/88* (2013.01); *E21B 33/068* (2013.01); *E21B 43/26* (2013.01); *E21B 43/267* (2013.01); *C09K 2208/28* (2013.01); *C09K 2208/32* (2013.01); *E21B 21/00* (2013.01); *E21B 43/04* (2013.01); *E21B 43/16* (2013.01)

(58) Field of Classification Search
CPC ........ E21B 43/26; E21B 33/12; E21B 34/063; E21B 2034/007; E21B 23/01; E21B 33/13; E21B 34/066; E21B 34/14; E21B 43/12; E21B 47/0905; E21B 47/122; E21B 17/08; E21B 2034/002; E21B 2034/005; E21B 23/08; E21B 33/068; E21B 33/128; E21B 33/129; E21B 33/14; E21B 33/16; E21B 34/06; E21B 34/103; E21B 37/06; E21B 43/04; E21B 43/045; E21B 43/082; E21B 43/086; E21B 43/088; E21B 43/14; E21B 43/16; E21B 43/267; E21B 47/00; E21B 47/06; E21B 47/065; E21B 47/12; C09K 11/025; C09K 11/7773; C09K 2208/28; C09K 2208/32; C09K 8/12; C09K 8/5083; C09K 8/5086; C09K 8/54
See application file for complete search history.

(56) References Cited

U.S. PATENT DOCUMENTS

| | | | |
|---|---|---|---|
| 4,225,697 A * | 9/1980 | Hergenrother | C08G 79/02 528/168 |
| 5,104,947 A | 4/1992 | Schacht et al. | |
| 7,156,174 B2 | 1/2007 | Roddy et al. | |
| 7,814,980 B2 | 10/2010 | Bryant et al. | |
| 7,906,464 B2 | 3/2011 | Davidson | |
| 2005/0167105 A1 | 8/2005 | Roddy et al. | |
| 2006/0112862 A1 | 6/2006 | Nguyen | |
| 2006/0118301 A1 | 6/2006 | East, Jr. et al. | |
| 2008/0194428 A1 | 8/2008 | Welton et al. | |
| 2010/0230108 A1 | 9/2010 | Todd et al. | |
| 2011/0269651 A1 * | 11/2011 | Bismarck | C04B 28/02 507/225 |

OTHER PUBLICATIONS

Allcock et al Synthesis of high polymeric alkoxy and aryloxyphosphonitriles, J. Am Chem. Soc, 1965, 87, 4216-4217.*
International Search Report and Written Opinion issued in related PCT Application No. PCT/US2014/033544 mailed Jan. 8, 2015, 12 pages.
Allcock, H.R. and Morozowich, N.L., 2012. Bioerodible polyphosphazenes and their medical potential. Polymer Chemistry, 3(3), pp. 578-590.
Lowe, A.B. and McCormick, C.L., 2002. Synthesis and solution properties of zwitterionic polymers. Chemical reviews, 102(11), pp. 4177-4190.
International Preliminary Report on Patentability issued in related Application No. PCT/US2014/033544, mailed Oct. 20, 2016 (9 pages).

* cited by examiner

*Primary Examiner* — Kumar R Bhushan
(74) *Attorney, Agent, or Firm* — Tenley Krueger; Baker Botts L.L.P.

(57) ABSTRACT

Methods of drilling a wellbore into a subterranean formation or of treating a treatment zone along a wellbore penetrating a subterranean formation or of treating a pipeline, the methods comprising steps of: (A) forming a fluid, the fluid comprising: (i) water; and (ii) a water-soluble linear polyphosphazene; and (B) introducing the fluid into the well or into the pipeline. In addition, a well system and methods are provided including such a fluid.

16 Claims, 1 Drawing Sheet

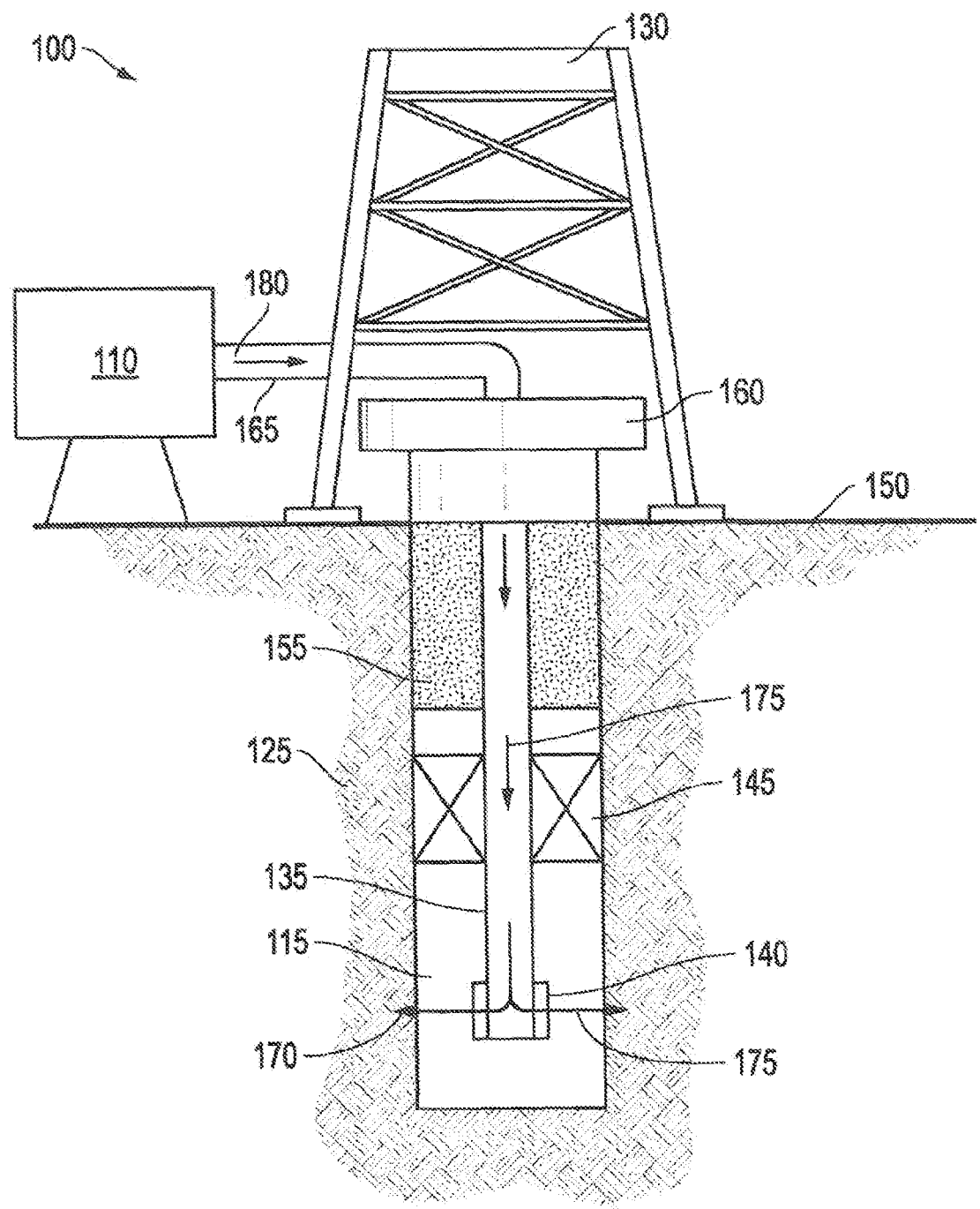

WATER-SOLUBLE LINEAR POLYPHOSPHAZENES IN WATER-BASED FLUIDS FOR USE IN WELLS OR PIPELINES

CROSS-REFERENCE TO RELATED APPLICATIONS

The present application is a U.S. National Stage Application of International Application No. PCT/US2014/033544 filed Apr. 9, 2014, which is incorporated herein by reference in its entirety for all purposes.

TECHNICAL FIELD

The disclosure is in the field of producing crude oil or natural gas from subterranean formations. More specifically, the disclosure generally relates to methods of drilling or treating a well or treating a pipeline with a water-based fluid including a linear polyphosphazene.

GENERAL DESCRIPTION OF EMBODIMENTS

Methods of drilling a wellbore into a subterranean formation or of treating a treatment zone along a wellbore penetrating a subterranean formation are provided, the methods comprising steps of: (A) forming a fluid, the fluid comprising: (i) water; and (ii) a water-soluble linear polyphosphazene; and (B) introducing the fluid into the well.

A well system is provided, wherein the well system includes a flowpath, the flowpath comprising: (a) a wellhead; and (b) a conduit extending from the wellhead into a wellbore; and a fluid disposed within the flowpath, wherein the fluid comprises: (i) water; and (ii) a water-soluble linear polyphosphazene.

Methods of treating a pipeline are proved, the methods comprising: (A) forming a fluid, the fluid comprising: (i) water; and (ii) a water-soluble linear polyphosphazene; and (B) introducing the fluid into the pipeline.

These and other embodiments of the disclosure will be apparent to one skilled in the art upon reading the following detailed description. While the disclosure is susceptible to various modifications and alternative forms, specific embodiments thereof will be described in detail and shown by way of example. It should be understood, however, that it is not intended to limit the disclosure to the particular forms disclosed.

BRIEF DESCRIPTION OF THE DRAWING

The accompanying drawing is incorporated into the specification to help illustrate examples according to some embodiments of the disclosure. It should be understood that the FIGURES of the drawing are not necessarily to scale.

FIG. 1 is a schematic illustration of a well operating environment and system.

DETAILED DESCRIPTION OF EMBODIMENTS

Definitions and Usages
 General Interpretation
 The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed. As used herein, the words "consisting essentially of," and all grammatical variations thereof are intended to limit the scope of a claim to the specified materials or steps and those that do not materially affect the basic and novel characteristic(s) of the claimed invention.

The indefinite articles "a" or "an" mean one or more than one of the component, part, or step that the article introduces.

Each numerical value should be read once as modified by the term "about" (unless already expressly so modified), and then read again as not so modified, unless otherwise indicated in context.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

It should be understood that algebraic variables and other scientific symbols used herein are selected arbitrarily or according to convention. Other algebraic variables can be used.

Terms such as "first," "second," "third," etc. may be assigned arbitrarily and are merely intended to differentiate between two or more components, parts, or steps that are otherwise similar or corresponding in nature, structure, function, or action. For example, the words "first" and "second" serve no other purpose and are not part of the name or description of the following name or descriptive terms. The mere use of the term "first" does not require that there be any "second" similar or corresponding component, part, or step. Similarly, the mere use of the word "second" does not require that there be any "first" or "third" similar or corresponding component, part, or step. Further, it is to be understood that the mere use of the term "first" does not require that the element or step be the very first in any sequence, but merely that it is at least one of the elements or steps. Similarly, the mere use of the terms "first" and "second" does not necessarily require any sequence. Accordingly, the mere use of such terms does not exclude intervening elements or steps between the "first" and "second" elements or steps, etc.

The control or controlling of a condition includes any one or more of maintaining, applying, or varying of the condition. For example, controlling the temperature of a substance can include heating, cooling, or thermally insulating the substance.

Oil and Gas Reservoirs

In the context of production from a well, "oil" and "gas" are understood to refer to crude oil and natural gas, respectively. Oil and gas are naturally occurring hydrocarbons in certain subterranean formations.

A "subterranean formation" is a body of rock that has sufficiently distinctive characteristics and is sufficiently continuous for geologists to describe, map, and name it.

A subterranean formation having a sufficient porosity and permeability to store and transmit fluids is sometimes referred to as a "reservoir."

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

A water-sensitive formation is a formation that includes reactive shale or clay, that is, shale or clay that swells when it comes in contact with water. Examples of such clays include smectite and illite.

Well Servicing

To produce oil or gas from a reservoir, a wellbore is drilled into a subterranean formation, which may be the reservoir or adjacent to the reservoir. Typically, a wellbore of a well must be drilled hundreds or thousands of feet into the earth to reach a hydrocarbon-bearing formation.

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation. A well service usually involves introducing a fluid into a well.

Drilling is the process of drilling the wellbore. After a portion of the wellbore is drilled, sections of steel pipe, referred to as casing, which are slightly smaller in diameter than the borehole, are placed in at least the uppermost portions of the wellbore. The casing provides structural integrity to the newly drilled borehole.

Cementing is a common well operation. For example, hydraulic cement compositions can be used in cementing operations in which a string of pipe, such as casing or liner, is cemented in a wellbore. The cement stabilizes the pipe in the wellbore and prevents undesirable migration of fluids along the annulus between the wellbore and the outside of the casing or liner from one zone along the wellbore to the next. Where the wellbore penetrates into a hydrocarbon-bearing zone of a subterranean formation, the casing can later be perforated to allow fluid communication between the zone and the wellbore. The cemented casing also enables subsequent or remedial separation or isolation of one or more production zones of the wellbore by using downhole tools, such as packers or plugs, or by using other techniques, such as forming sand plugs or placing cement in the perforations. Hydraulic cement compositions can also be utilized in intervention operations, such as in plugging highly permeable zones, or fractures in zones, that may be producing too much water, plugging cracks or holes in pipe strings, and the like.

Completion is the process of making a well ready for production or injection. This principally involves preparing a zone of the wellbore to the required specifications, running in the production tubing and associated downhole equipment, as well as perforating and stimulating as required.

Intervention is any operation carried out on a well during or at the end of its productive life that alters the state of the well or well geometry, provides well diagnostics, or manages the production of the well.

Workover can broadly refer to any kind of well intervention that involves invasive techniques, such as wireline, coiled tubing, or snubbing. More specifically, however, workover usually refers to a process of pulling and replacing a completion.

Drilling, completion, and intervention operations can include various types of treatments that are commonly performed on a well or subterranean formation. For example, a treatment for fluid-loss control can be used during any of drilling, completion, and intervention operations. During completion or intervention, stimulation is a type of treatment performed to enhance or restore the productivity of oil and gas from a well. Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Other types of completion or intervention treatments can include, for example, gravel packing, consolidation, and controlling excessive water production.

Wells

A "well" includes a wellhead and at least one wellbore from the wellhead penetrating the earth. The "wellhead" is the surface termination of a wellbore, which surface may be on land or on a seabed.

A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well or any other tubulars in the well. The "borehole" usually refers to the inside wellbore wall, that is, the rock surface or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

A wellbore can be used as a production or injection wellbore. A production wellbore is used to produce hydrocarbons from the reservoir. An injection wellbore is used to inject a fluid, for example, liquid water or steam, to drive oil or gas to a production wellbore.

As used herein, introducing "into a well" means introducing at least into and through the wellhead. According to various techniques known in the art, tubulars, equipment, tools, or fluids can be directed from the wellhead into any desired portion of the wellbore.

As used herein, the word "tubular" means any kind of structural body in the general form of a tube. Tubulars can be of any suitable body material, but in the oilfield they are most commonly of steel. Examples of tubulars in oil wells include, but are not limited to, a drill pipe, a casing, a tubing string, a liner pipe, and a transportation pipe.

In the context of a well or wellbore, a "portion" or "interval" refers to any downhole portion or interval along the length of a wellbore.

A "zone" of a well refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." A "treatment zone" refers to a zone into which a fluid is directed to flow from the wellbore. As used herein, "into a treatment zone" means into and through the wellhead and, additionally, through the wellbore and into the treatment zone.

Generally, the greater the depth of the formation, the higher the static temperature and pressure of the formation. Initially, the static pressure equals the initial pressure in the formation before production.

Deviated wells are wellbores inclined at various angles to the vertical.

Complex wells include inclined wellbores in high-temperature or high-pressure downhole conditions.

A "design" refers to the estimate or measure of one or more parameters planned or expected for a particular fluid or stage of a well service or treatment. For example, a fluid can be designed to have components that provide a minimum density or viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment during the time of a treatment. For example, the design temperature for a well treatment takes into account not only the bottom hole static temperature ("BHST"), but also the effect of the temperature of the fluid on the BHST during treatment. The design temperature for a fluid is sometimes referred to as the bottom hole circulation temperature ("BHCT"). Because fluids may be considerably cooler than BHST, the difference between the two temperatures can be quite large. Ultimately, if left undisturbed a subterranean formation will return to the BHST.

Pipelines

"Pipeline" or "pipeline transport" refers to a conduit made from pipes connected end-to-end for long-distance fluid transport. Oil pipelines are made from steel or plastic tubulars with inner diameter typically from 4 to 48 inches (100 to 1,200 mm). Most pipelines are typically buried at a depth of about 3 to 6 feet (0.91 to 1.8 m). To protect pipes from impact, abrasion, and corrosion, a variety of methods are used. These can include wood lagging (wood slats), concrete coating, rockshield, high-density polyethylene, imported sand padding, and padding machines. The oil is kept in motion by pump stations along the pipeline, and usually flows at speed of about 3.3 to 20 ft/s (1 to 6 meters per second).

Gathering pipelines are a group of smaller interconnected pipelines forming complex networks with the purpose of bringing crude oil or natural gas from several nearby wells to a treatment plant or processing facility. In this group, pipelines are usually relatively short (usually about 100 to 1000 yards or meters) and with small diameters (usually about 4 to about 12 inches). Also sub-sea pipelines for collecting product from deep water production platforms are considered gathering systems.

Transportation pipelines are mainly long pipes (many miles or kilometers) with large diameters (larger than 12 inches or 30 cm), moving products (oil, gas, refined products) between cities, countries, and even continents. These transportation networks include several compressor stations in gas lines or pump stations for crude oil or multi-product pipelines.

Distribution pipelines are composed of several interconnected pipelines with small diameters (usually about 1 to about 4 inches), used to take the products to the final consumer. An example of distribution pipelines is feeder lines to distribute natural gas to homes and businesses downstream. Pipelines at terminals for distributing products to tanks and storage facilities are included in this group.

A "portion" or "interval" of a pipeline refers to any portion of the length of a pipeline.

Phases, Materials, and Physical States

As used herein, "phase" is used to refer to a substance having a chemical composition and physical state that is distinguishable from an adjacent phase of a substance having a different chemical composition or a different physical state.

The word "material" refers to the substance, constituted of one or more phases, of a physical entity or object. Rock, water, air, metal, cement slurry, sand, and wood are all examples of materials. The word "material" can refer to a single phase of a substance on a bulk scale (larger than a particle) or a bulk scale of a mixture of phases, depending on the context.

As used herein, if not other otherwise specifically stated, the physical state or phase of a substance (or mixture of substances) and other physical properties are determined at a temperature of 77° F. (25° C.) and a pressure of 1 atmosphere (Standard Laboratory Conditions) without applied shear.

Particles and Particulates

As used herein, a "particle" refers to a body having a finite mass and sufficient cohesion such that it can be considered as an entity but having relatively small dimensions. A particle can be of any size ranging from molecular scale to macroscopic, depending on context.

A particle can be in any physical state. For example, a particle of a substance in a solid state can be as small as a few molecules on the scale of nanometers up to a large particle on the scale of a few millimeters, such as large grains of sand. Similarly, a particle of a substance in a liquid state can be as small as a few molecules on the scale of nanometers up to a large drop on the scale of a few millimeters. A particle of a substance in a gas state is a single atom or molecule that is separated from other atoms or molecules such that intermolecular attractions have relatively little effect on their respective motions.

As used herein, particulate or particulate material refers to matter in the physical form of distinct particles in a solid or liquid state (which means such an association of a few atoms or molecules). As used herein, a particulate is a grouping of particles having similar chemical composition and particle size ranges anywhere in the range of about 0.5 micrometer (500 nm), for example, microscopic clay particles, to about 3 millimeters, for example, large grains of sand.

A particulate can be of solid or liquid particles. As used herein, however, unless the context otherwise requires, particulate refers to a solid particulate. Of course, a solid particulate is a particulate of particles that are in the solid physical state, that is, the constituent atoms, ions, or molecules are sufficiently restricted in their relative movement to result in a fixed shape for each of the particles.

Dispersions

A dispersion is a system in which particles of a substance of one chemical composition and physical state are dispersed in another substance of a different chemical composition or physical state. In addition, phases can be nested. If a substance has more than one phase, the most external phase is referred to as the continuous phase of the substance as a whole, regardless of the number of different internal phases or nested phases.

A dispersion can be classified in different ways, including, for example, based on the size of the dispersed particles, the uniformity or lack of uniformity of the dispersion, and, if a fluid, by whether or not precipitation occurs.

A dispersion is considered to be heterogeneous if the dispersed particles are not dissolved and are greater than about 1 nanometer in size. (For reference, the diameter of a molecule of toluene is about 1 nm and a molecule of water is about 0.3 nm).

Heterogeneous dispersions can have gas, liquid, or solid as an external phase. For example, in a case where the dispersed-phase particles are liquid in an external phase that is another liquid, this kind of heterogeneous dispersion is more particularly referred to as an emulsion. A solid dispersed phase in a continuous liquid phase is referred to as a sol, suspension, or slurry, partly depending on the size of the dispersed solid particulate.

A dispersion is considered to be homogeneous if the dispersed particles are dissolved in solution or the particles are less than about 1 nanometer in size. Even if not dissolved, a dispersion is considered to be homogeneous if the dispersed particles are less than about 1 nanometer in size.

Solutions

A solution is a special type of homogeneous mixture. A solution is considered homogeneous: (a) because the ratio of solute to solvent is the same throughout the solution; and (b) because solute will never settle out of solution, even under powerful centrifugation, which is due to intermolecular attraction between the solvent and the solute. An aqueous solution, for example, saltwater, is a homogenous solution in which water is the solvent and salt is the solute.

One may also refer to the solvated state, in which a solute ion or molecule is complexed by solvent molecules. A chemical that is dissolved in solution is in a solvated state. The solvated state is distinct from dissolution and solubility. Dissolution is a kinetic process, and is quantified by its rate. Solubility quantifies the concentration of the solute at which there is dynamic equilibrium between the rate of dissolution and the rate of precipitation of the solute. Dissolution and solubility can be dependent on temperature and pressure, and may be dependent on other factors, such as salinity or pH of an aqueous phase.

Hydratability or Solubility

As referred to herein, "hydratable" means capable of being hydrated by contacting the hydratable material with water. Regarding a hydratable material that includes a polymer, this means, among other things, to associate sites on the polymer with water molecules and to unravel and extend the polymer chain in the water.

The term "solution" is intended to include not only true molecular solutions but also dispersions of a polymer wherein the polymer is so highly hydrated as to cause the dispersion to be visually clear and having essentially no particulate matter visible to the unaided eye. The term "soluble" is intended to have a meaning consistent with these meanings of solution.

A substance is considered to be "soluble" in a liquid if at least 10 grams of the substance can be hydrated or dissolved in one liter of the liquid when tested at 77° F. (25° C.) and 1 atmosphere pressure for 2 hours, considered to be "insoluble" if less than 1 gram per liter, and considered to be "sparingly soluble" for intermediate solubility values.

As will be appreciated by a person of skill in the art, the hydratability, dispersibility, or solubility of a substance in water can be dependent on the salinity, pH, or other substances in the water. Accordingly, the salinity, pH, and additive selection of the water can be modified to facilitate the hydratability, dispersibility, or solubility of a substance in aqueous solution. To the extent not specified, the hydratability, dispersibility, or solubility of a substance in water is determined in deionized water, at neutral pH, and without any other additives.

As used herein, "salt tolerance" of a polymeric material means it hydrates well in the presence of dissolved salts to provide viscosity, for example, in 2% KCl or in presence of divalent ions, for example, in synthetic seawater.

Fluids

A fluid can be a homogeneous or heterogeneous. In general, a fluid is an amorphous substance that is or has a continuous phase of particles that are smaller than about 1 micrometer that tends to flow and to conform to the outline of its container.

Examples of fluids are gases and liquids. A gas (in the sense of a physical state) refers to an amorphous substance that has a high tendency to disperse (at the molecular level) and a relatively high compressibility. A liquid refers to an amorphous substance that has little tendency to disperse (at the molecular level) and relatively high incompressibility. The tendency to disperse is related to Intermolecular Forces (also known as van der Waal's Forces). (A continuous mass of a particulate, for example, a powder or sand, can tend to flow as a fluid depending on many factors such as particle size distribution, particle shape distribution, the proportion and nature of any wetting liquid or other surface coating on the particles, and many other variables. Nevertheless, as used herein, a fluid does not refer to a continuous mass of particulate as the sizes of the solid particles of a mass of a particulate are too large to be appreciably affected by the range of Intermolecular Forces.)

Every fluid inherently has at least a continuous phase. A fluid can have more than one phase. For example, a fluid can be in the form of a suspension (larger solid particles dispersed in a liquid phase), a sol (smaller solid particles dispersed in a liquid phase), an emulsion (liquid particles dispersed in another liquid phase), or a foam (a gas phase dispersed in a liquid phase).

The continuous phase of a drilling or treatment fluid for use in a well or pipeline is a fluid under Standard Laboratory Conditions.

The term "water" is used generally herein to include fresh water, brackish water, seawater, or brine, unless the context otherwise requires. It various applications, the water may also be of a produced water.

As used herein, the term "brine" is intended to include, unless the context otherwise requires, any aqueous solution having greater than 1,000 ppm total dissolved mineral salts. Oil field brines commonly contain varying concentrations of mineral salts, e.g., sodium chloride, calcium chloride, and magnesium salts. Aqueous solutions are frequently modified by addition of potassium chloride to stabilize the subsurface clay. Accordingly, potassium chloride is frequently encountered in brines.

As used herein, the term "hard brine" is intended to include, unless the context otherwise requires, any aqueous solution having greater than 1,000 ppm total dissolved divalent mineral salts, such as magnesium or calcium. For example, a hard brine can have about 1,000 ppm to about 16,000 ppm divalent cations such calcium ions with a total dissolved solids (TDS) level in the range of 100,000 to 300,000 ppm.

As used herein, a "water-based" fluid means that water is the dominant material of the continuous phase, that is, greater than 50% by weight, of the continuous phase of the fluid based on the combined weight of water and any other solvents in the phase (that is, excluding the weight of any dissolved solids).

In contrast, an "oil-based" fluid means that oil is the dominant material by weight of the continuous phase of the fluid. In this context, the oil of an oil-based fluid can be any oil.

In the context of a fluid, oil is understood to refer to any kind of oil in a liquid state, whereas gas is understood to refer to a physical state of a substance, in contrast to a liquid. In this context, an oil is any substance that is liquid under Standard Laboratory Conditions, is hydrophobic, and soluble in organic solvents. Oils typically have a high carbon and hydrogen content and are non-polar substances. This general definition includes classes such as petrochemical oils, vegetable oils, and many organic solvents. All oils, even synthetic oils, can be traced back to organic sources.

Apparent Viscosity of a Fluid

Viscosity is a measure of the resistance of a fluid to flow. In everyday terms, viscosity is "thickness" or "internal friction." Therefore, pure water is "thin," having a relatively low viscosity whereas honey is "thick," having a relatively higher viscosity. Put simply, the less viscous the fluid is, the greater its case of movement (fluidity). More precisely, viscosity is defined as the ratio of shear stress to shear rate.

Most oilfield fluids are non-Newtonian fluids. Accordingly, the apparent viscosity of a fluid applies only under a particular set of conditions including shear stress versus shear rate, which must be specified or understood from the context. As used herein, a reference to viscosity is actually a reference to an apparent viscosity. Apparent viscosity is commonly expressed in units of mPa·s or centipoise (cP), which are equivalent.

Gels and Deformation

Technically, a "gel" is a semi-solid, jelly-like physical state or phase that can have properties ranging from soft and weak to hard and tough. Shearing stresses below a certain finite value fail to produce permanent deformation. The minimum shear stress that will produce permanent deformation is referred to as the shear strength or gel strength of the gel.

The physical state of a gel is formed by a network of interconnected molecules, such as a crosslinked polymer or a network of micelles in a continuous liquid phase. The network gives a gel phase its structure and an apparent yield point. At the molecular level, a gel is a dispersion in which both the network of molecules is continuous and the liquid is continuous. A gel is sometimes considered as a single phase.

In the oil and gas industry, however, the term "gel" may be used to refer to any fluid having a viscosity-increasing agent, regardless of whether it is a viscous fluid or meets the technical definition for the physical state of a gel. A "base gel" is a term used in the field for a fluid that includes a viscosity-increasing agent, such as guar or other polymer, but that excludes crosslinking agents. Typically, a base gel is mixed with another fluid containing a crosslinker, wherein the mixture is adapted to form a crosslinked gel. Similarly, a "crosslinked gel" may refer to a substance having a viscosity-increasing agent that is crosslinked, regardless of whether it is a viscous fluid or meets the technical definition for the physical state of a gel.

As used herein, a substance referred to as a "gel" is subsumed by the concept of "fluid" if it is a pumpable fluid.

Drilling and Treatment Fluids

A fluid can be, for example, a drilling fluid, a setting composition (e.g., a hydraulic cement composition), a treatment fluid, including merely as a spacer fluid. If a fluid is to be used in a relatively small volume, for example less than about 200 barrels (about 8,400 US gallons or about 32 m$^3$), it is sometimes referred to as a wash, dump, slug, or pill.

Drilling fluids, also known as drilling muds or simply "muds," are typically classified according to their base fluid, that is, the nature of the continuous phase. A water-based mud ("WBM") has a water phase as the continuous phase. The water can be brine. A brine-based drilling fluid is a water-based mud in which the aqueous component is brine. In some cases, oil may be emulsified in a water-based drilling mud. An oil-based mud ("OBM") has an oil phase as the continuous phase. In some cases, a water phase is emulsified in the oil-based mud.

A drill-in fluid is a drilling mud adapted to drill into or through a reservoir. A purpose of a drill-in fluid is to minimize damage to the reservoir and provide for easier clean up. A drill-in fluid may more closely resemble a treatment fluid used during completion of a well. For example, it may be a brine containing only selected solids of appropriate particle size ranges (salt crystals or calcium carbonate) and polymers. Only additives essential for filtration control and cuttings carrying are normally used in a drill-in fluid.

As used herein, the word "treatment" refers to any treatment for changing a condition of a portion of a pipeline, a wellbore, or a subterranean formation adjacent a wellbore; however, the word "treatment" does not necessarily imply any particular treatment purpose. A treatment usually involves introducing a fluid for the treatment into a well or pipeline, in which case it may be referred to as a treatment fluid. As used herein, a "treatment fluid" is a fluid used in a treatment. The word "treatment" in the term "treatment fluid" does not necessarily imply any particular treatment or action by the fluid.

As used herein, a "downhole" fluid (or gel) is an in-situ fluid in a well, which may be the same as a fluid at the time it is introduced, or a fluid mixed with another fluid downhole, or a fluid in which chemical reactions are occurring or have occurred in-situ downhole.

General Approach

Polyphosphazene polymers are hybrid inorganic/organic polymers with a nitrogen/phosphorus backbone. There are several different molecular architectures with alternative phosphorus and nitrogen atoms, including: linear, cyclic, cyclolinear, cyclomatrix, block copolymer, star, dendritic, and comb-type structures.

This disclosure relates to the use of linear polyphosphazene structures.

A representative chemical process for forming a linear polyphosphazene structure includes two steps. First, a cyclic tri-mer of hexachlorocyclotriphosphazene is heated to generate the linear, open-chain polymer of poly(dichlorophosphazene). The poly(dichlorophosphazene) can then be reacted with another molecule to form a substituted polyphosphazene, wherein the chlorine atoms are substituted with a group of the other molecule. For example, the poly(dichlorophosphazene) can be reacted with alcohols, alkali metal salts of alcohols, primary amines, or secondary amines to produce a correspondingly substituted poly(phosphazene). The reaction releases a by-product such as hydrochloric acid or an alkali metal chloride. As shown in the following chemical equations, linear polymer of poly(dichlorophosphazene) (A) can be readily reacted with alcohols, primary or secondary amines to result in substituted polyphosphazene products such as (B), (C), or (D):

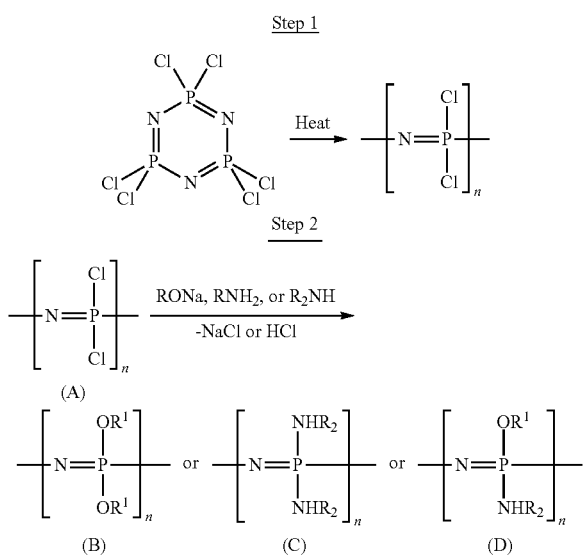

Various R groups are contemplated here including: alcohols; ethylene glycol; glycerin; polyethylene oxide; polypropylene oxide; mixed EO/PO oxides; phenols; substituted phenols; various amines and polyamines.

This type of reaction can produce to a very wide range in products, with a wide range of chemical/physical properties depending upon the R group used.

In various embodiments, the intermediate poly(dichlorophosphazene) has an "n" value in the range of about 1,000 to about 100.000. In various embodiments, the intermediate poly(dichlorophosphazene) (A) has an "n" value of about 15,000. Thus, molecular weight will be in the range of about 2 million to about 10 million for most of the products made in B, C, and D, above. Such polymers are expected to have good stability of chemical and physical properties.

This disclosure is intended to cover linear polyphosphazenes such as B, C, and D with a range of R groups for use in drilling fluids or treatment fluids in a well or in a pipeline. Applications would include drilling fluid viscosifiers, suspension agents, fluid loss, rheology modifiers (dispersants/thinners), lost-circulation materials (LCMs), lubricants, drag reducing agents.

Some of the properties of the various polyphosphazene species B, C, and D above can include: water solubility to water insolubility, high temperature stability, stability to hydrolysis, stable to salinity, stability to high pH, biodegradability, high dipole moment, chemically inertness or stability, and abroad range of polymer glass transition ("Tg").

A wide range of water-soluble linear polyphosphazenes are possible according to this disclosure. Such products have a unique phosphorus and nitrogen group in the polymer backbone. Desired polymer properties can be tailored for specific applications based on the substituents on a polyphosphazene polymer backbone. This can be done by varying the type of organic side-chain substituents accordingly. Water-soluble linear polymeric polyphosphazenes can be selected for having a set of chemical and physical properties useful for drilling fluid, well treatment, and pipeline treatment applications, including salt tolerance, hydrolytic stability, water solubility, for example.

Linear polyphosphazenes are easy to make. It is relatively easy to tailor a linear polyphosphazene structure and properties for various applications in a well.

According to a general approach of the disclosure, methods of drilling a wellbore into a subterranean formation or of treating a treatment zone along a wellbore penetrating a subterranean formation are provided, the method comprising: (A) forming a fluid, the fluid comprising: (i) water, and (ii) a water-soluble linear polyphosphazene; and (B) introducing the fluid into the well.

According to another general approach, a well system is provided, wherein the well system includes a flowpath, the flowpath comprising: (a) a wellhead; and (b) a conduit extending from the wellhead into a wellbore; and a fluid disposed within the flowpath, wherein the fluid comprises: (i) water; and (ii) a water-soluble linear polyphosphazene.

According to another general approach, methods of treating a pipeline are proved, the methods comprising: (A) forming a fluid, the fluid comprising: (i) water; and (ii) a water-soluble linear polyphosphazene; and (B) introducing the fluid into the pipeline.

It should be understood that any of the water-soluble linear polyphosphazenes described herein can be used in a fluid for a method either a well or a pipeline, depending on the polyphosphazene characteristics desired for a particular application.

In various embodiments, the fluid can include more than one water-soluble linear polyphosphazene.

It should be understood, of course, that unless the context otherwise requires, a "polyphosphazene" refers to a group of such polymeric molecules having similar monomeric structures, but most likely having varying polymeric chain lengths. The chain lengths of a polymer can be expressed, for example, as having average number "n" of the repeating monomeric units or as an average molecular weight.

It should also be understood, of course, that unless the context otherwise requires, "different" polyphosphazenes have one or more different monomeric units from each other, regardless of the chain lengths of the polymer molecules.

Polyphosphazene Characteristics

Solubility

The polyphosphazene is selected for being water-soluble. In various embodiments, the polyphosphazene is at least 2% by weight soluble in deionized water.

Non-Degradable

As used herein, a degradable material is capable of undergoing an irreversible degradation downhole. The term "irreversible" as used herein means that the degradable material once degraded should not recrystallize or reconsolidate while downhole in the treatment zone, that is, the degradable material should degrade in situ but should not recrystallize or reconsolidate in situ. In addition, a degradable material serving such a purpose should degrade within the time of a drilling or treatment job.

The degradation can be a result of, inter alia, a chemical or thermal reaction or a reaction induced by radiation. A degradable material can be selected to degrade by at least one mechanism selected from the group consisting of, for example, hydrolysis, decomposition, or sublimation.

Chemical Stability for Downhole Time and Conditions

In various embodiments, the polyphosphazene is at least 90% by weight stable, or at least 90% by weight non-degradable, or at least 90% of its functional groups are non-hydrolyzable for a full duration of conditions of the use of the fluid in the drilling or treating of a zone of a well or pipeline. It should be understood that it is desirable but not necessary that the polyphosphazene satisfy all of these criteria.

In various embodiments, the polyphosphazene is stable, or at least non-degradable, or at least its functional groups are non-hydrolyzable for a full duration of conditions of the use of the fluid in the drilling or treating of zone of a well or pipeline. It should be understood that it is desirable but not necessary that the polyphosphazene satisfy all of these criteria.

Various Stability Testing Standards at Lower Temperature and Shorter Time

In various embodiments, less than 10% of the substituents on the polyphosphazene hydrolyze or wherein less than 10% by weight of the polyphosphazene degrades in a first test of a 1% by weight solution of the polyphosphazene in deionized water having a pH initially adjusted anywhere in the range of about 6 to about 12 for 7 days standing without shear at about 250° F. (120° C.). It should be understood that any one pH in the pH range would satisfy this test; it is desirable but not necessary that the polyphosphazene satisfy the test at every pH in the pH range.

In various embodiments, the first test is modified to a second test including 10% NaCl by weight of the water.

In various embodiments, the second test is modified to a third test wherein the pH is required to be initially adjusted to be about 10.

In various embodiments, less than 5% of the substituents on the polyphosphazene hydrolyze or wherein less than 5% by weight of the polyphosphazene degrades in any one of the first test, the second test, or the third test. In various embodiments, less than 5% of the substituents on the polyphosphazene hydrolyze or wherein less than 5% by weight of the polyphosphazene degrades in all of the first test, the second test, and the third test.

Various Stability Testing Standards at Longer Time and Higher Temperature

In various embodiments, less than 10% of the substituents on the polyphosphazene hydrolyze or wherein less than 10% by weight of the polyphosphazene degrades in a fourth test of a 1% by weight solution of the polyphosphazene in deionized water having a pH initially adjusted anywhere in the range of about 6 to about 12 for 30 days standing without shear at about 300° F. (149° C.). Again, it should be understood that any one pH in the pH range would satisfy this test; it is desirable but not necessary that the polyphosphazene satisfy the test at every pH in the pH range.

In various embodiments, the fourth test is modified to a fifth test including 10% NaCl by weight of the water.

In various embodiments, the fifth test is modified to a sixth test wherein the pH is required to be initially adjusted to be about 10.

In various embodiments, less than 5% of the substituents on the polyphosphazene hydrolyze or wherein less than 5% by weight of the polyphosphazene degrades in any one of the fourth test, the fifth test, or the sixth test. In various embodiments, less than 5% of the substituents on the polyphosphazene hydrolyze or wherein less than 5% by weight of the polyphosphazene degrades in all of the fourth test, the fifth test, and the sixth test.

Biodegradability

In various embodiments, the polyphosphazene is biodegradable.

Biodegradable means the process by which complex molecules are eventually broken down by micro-organisms to produce simpler compounds. This normally takes much longer than the duration of a drilling or treatment operation.

Biodegradation can be either aerobic (with oxygen) or anaerobic (without oxygen). The potential for biodegradation is commonly measured on fluids or their components to ensure that they do not persist in the environment. A variety of tests exist to assess biodegradation.

As used herein, a substance is considered "biodegradable" if the substance passes a ready biodegradability test or an inherent biodegradability test. It is preferred that a substance is first tested for ready biodegradability, and only if the substance does not pass at least one of the ready biodegradability tests then the substance is tested for inherent biodegradability.

In accordance with Organisation for Economic Co-operation and Development ("OECD") guidelines, the following six tests permit the screening of chemicals for ready biodegradability. As used herein, a substance showing more than 60% biodegradability in 28 days according to any one of the six ready biodegradability tests is considered a pass level for classifying it as "readily biodegradable," and it may be assumed that the substance will undergo rapid and ultimate degradation in the environment. The six ready biodegradability tests are: (1) 301A: DOC Die-Away; (2) 301B: CO2 Evolution (Modified Sturm Test); (3) 301C: MITI (I) (Ministry of International Trade and Industry, Japan); (4) 301D: Closed Bottle; (5) 301E: Modified OECD Screening; and (6) 301F: Manometric Respirometry.

In accordance with OECD guidelines, the following three tests permit the testing of chemicals for inherent biodegradability. As used herein, a substance with a biodegradation or biodegradation rate of >20% is regarded as "inherently primary biodegradable." A substance with a biodegradation or biodegradation rate of >70% is regarded as "inherently ultimate biodegradable." As used herein, a substance passes the inherent biodegradability test if the substance is either regarded as inherently primary biodegradable or inherently ultimate biodegradable when tested according to any one of three inherent biodegradability tests. The three tests are: (1) 302A: 1981 Modified SCAS Test; (2) 302B: 1992 Zahn-Wellens Test; and (3) 302C: 1981 Modified MITI Test. Inherent biodegradability refers to tests which allow prolonged exposure of the test compound to microorganisms, a more favorable test compound to biomass ratio, and chemical or other conditions which favor biodegradation.

Polyphosphazene Structural Limitations

Length of Polyphosphazene

In various embodiments, the polyphosphazene has a chain length in the range of 1,000 to about 100,000 monomeric units. In various embodiments, the polyphosphazene has a chain length in the range of about 10,000 to about 20,000 monomeric units.

Substituents for Forming the Water-Soluble Polyphosphazene

In various embodiments, the polyphosphazene is of the type that can be formed by a reaction between a poly (dichloropolyphosphazene) and at least one other molecule to form at least one type of a substituent for the chlorine of the poly(dichlorpolyphosophazene). It should be understood, however, that while the structures can be conveniently obtained and described by this type of synthesis, other synthesis routes that can obtain the same types of products are contemplated.

In various embodiments, the other molecule is selected from the group consisting of: a molecule having at least one —OH group or —O$^-$M$^+$ group, where M is a alkali metal cation. In various embodiments, the other molecule is selected from the group consisting of: alcohols, polyols, phenol, and substituted phenols. In various embodiments, the polyols are selected from the group consisting of ethylene glycol and glycerin.

In various embodiments, the other molecule is a polymer oxide. In various embodiments, the polymer oxide is selected from the group consisting of: polyethylene oxide, polypropylene oxide, and copolymers of ethylene oxide and propylene oxide. In various embodiments, the chain length of the polymer oxide is in the range of about 20 to about 100.

In various embodiments, the other molecule is selected from the group consisting of: a molecule having a least one primary or secondary amine group. In various embodiments, the other molecule is selected from the group consisting of: poly primary amines and poly secondary amines.

In various embodiments, the polyphosphazene has only one type of the substituent. In various embodiments, the polyphosphazene has at least two different types of the substituent.

Non-Amphiphilic

In various embodiments, the polyphosphazene is non-amphiphilic (i.e., not having "full positive" & "full negative" charges on molecule, e.g., not a betaine).

Examples of Polyphosphazene Structures for Types of Uses

To facilitate a better understanding of the present disclosure, the following examples of certain aspects of some embodiments are given. In no way should the following examples be read to limit, or define, the entire scope of the disclosure.

Suspending Agent

In various drilling and treatment applications, it is desirable to disperse and suspend a solid particulate in a drilling fluid or treatment fluid for use in a well or pipeline.

In various embodiments, the polyphosphazene is:

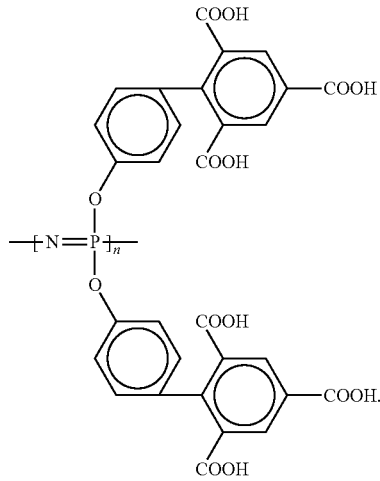

In various embodiments, "n" in the above structure is in the range of about 10,000 to about 20,000. In various embodiments, "n" is about 15,000.

In various embodiments, such a polyphosphazene can be advantageously employed for its aqueous-based suspension properties.

In various embodiments, such a polyphosphazene in aqueous solution can be crosslinked with dissolved metal cations, such as calcium ($Ca^{+2}$), magnesium ($Mg^{+2}$), aluminum ($Al^{+3}$), ferrous ($Fe^{+2}$), manganese ($Mn^{+2}$), and zirconium ($Zr^{+4}$). For example, a drilling fluid often includes soluble calcium cations (as $Ca^{+2}$) to ionically crosslink such a polyphosphazene in aqueous solution. The calcium cation crosslinks will be through the carboxyl groups of such a polyphosphazene. A 3-dimensional structure of the cross-linked polyphosphazene can provide suspension properties or gel characteristics for a fluid for suspending a particulate in the fluid. Examples of particulates to be suspended include, for example, barite as a weighting agent or drill solids for a drilling fluid, proppant for a fracturing fluid, or gravel for a gravel packing fluid.

Friction Reducer

In various embodiments, the polyphosphazene is:

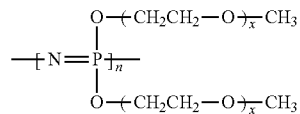

wherein "x" can vary or be anywhere is in the range of about 20 to about 100. In various embodiments, "x" is about 50.

In various embodiments, "n" in the above structure is in the range of about 10,000 to about 20,000. In various embodiments, "n" is about 15,000

In various embodiments, this type of polyphosphazene can be advantageously employed for drag reduction in water-based fluids. Long-chain polyethylene oxy units can provide drag reduction in aqueous fluids. This polyphosphazene has such long polyethylene chains.

Fluid-Loss Control Agent

Fluid loss refers to the undesirable leakage of a fluid phase of any type of fluid into the permeable matrix of a zone, which zone may or may not be a treatment zone. Fluid-loss control refers to treatments designed to reduce such undesirable leakage.

Fluid-loss control agents are sometimes used in drilling fluids or in treatment fluids in a well. A fluid-loss control pill is a treatment fluid that is designed or used to provide some degree of fluid-loss control. A fluid-loss control pill is usually used prior to introducing another drilling fluid or treatment fluid into zone of a well.

In various embodiments, the polyphosphazene is:

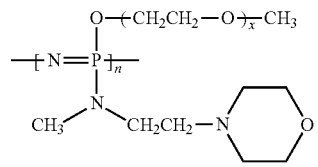

wherein "x" is in the range of about 1 to about 10. In various embodiments, "x" is 1.

In various embodiments, "n" in the above structure is in the range of about 10,000 to about 20,000. In various embodiments, "n" is about 15,000.

In various embodiments, such a polyphosphazene can be advantageously employed for fluid-loss control in water-based fluids. This polyphosphazene has a good combination of water solubility plus nitrogen atoms that can adhere to drill solids. This combination of properties is a good example of providing fluid-loss control in aqueous fluids.

It should be understood that there can be an element of randomness in this type of polyphosphazene because it has two different substituent groups on the phosphorous atoms (P). Of course, a person of skill in the art would appreciate that there are chemical techniques and methodologies to produce such a structure. They methodologies can involve, for example, starting with chloropolymers other than poly (dichlorophosphazene) and using protecting reactions. Otherwise, for example, reacting the poly(dichlorophosphazene) with two different precursors in a 50/50 mix will lead to three types of polyphosphazenes:

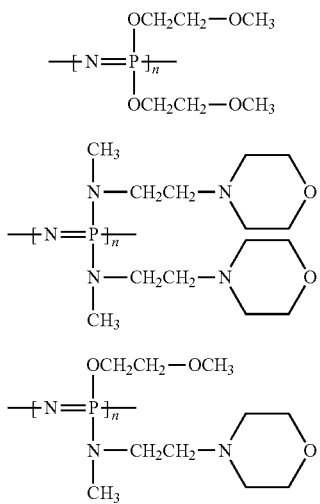

Reacting the initial chloropolymer with one precursor and then the other will still lead to a distribution of A, B, and C, above.

Clay or Shale Inhibitor

In various embodiments, the polyphosphazene is:

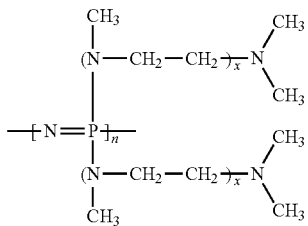

wherein "x" is in the range of 1 to 5. In various embodiments, "x" is 2.

In various embodiments, "n" in the above structure is in the range of about 1,000 to about 8,000. In various embodiments, "n" is about 5,000.

Such a polyphosphazene is similar to the one below (which may be used, for example, as a corrosion inhibitor), except for the difference of a methyl group on the nitrogen atoms adjacent to the phosphorous and, in various embodiments, wherein "n" is lower.

In various embodiments, such a polyphosphazene can be advantageously employed for shale and clay inhibition. Lower molecular weight poly-nitrogen compounds can be effective at shale and clay inhibition. Inhibition here means they reduce swelling or dispersion of shales and clays leading to wellbore problems.

Corrosion and Inhibitors

Corrosion of metals can occur anywhere in an oil or gas production system, such in the downhole tubulars, equipment, and tools of a well, in surface lines and equipment, or transportation pipelines and equipment.

"Corrosion" is the loss of metal due to chemical or electrochemical reactions, which could eventually destroy a structure. The corrosion rate will vary with time depending on the particular conditions to which a metal is exposed, such as the amount of water, pH, other chemicals, temperature, and pressure. Examples of common types of corrosion include, but are not limited to, the rusting of metal, the dissolution of a metal in an acidic solution, oxidation of a metal, chemical attack of a metal, electrochemical attack of a metal, and patina development on the surface of a metal.

Even weakly acidic fluids having a pH up to about 4 can be problematic in that they can cause corrosion of metals. Above pH 4, corrosion is dependent upon oxygen concentration and much less dependent on pH. As used herein with reference to the problem of corrosion, "acid" or "acidity" refers to a Bronsted-Lowry acid or acidity.

As used herein, the term "inhibit" or "inhibitor" refers to slowing down or lessening the tendency of a phenomenon (for example, corrosion) to occur or the degree to which that phenomenon occurs. The term "inhibit" or "inhibitor" does not imply any particular mechanism, or degree of inhibition.

A "corrosion inhibitor package" can include one or more different chemical corrosion inhibitors, sometimes delivered to the well site in one or more solvents to improve flowability or handlability of the corrosion inhibitor before forming a fluid.

When included in a fluid, in various embodiments a corrosion inhibitor can be in a concentration of at least 0.1% by weight of a fluid. For example, the corrosion inhibitor can be in a concentration in the range of 0.1% to 15% by weight of the fluid.

In various embodiments, the polyphosphazene is:

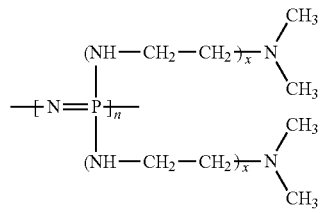

wherein "x" is in the range of 1 to 5. In various embodiments, "x" is 1.

In various embodiments, "n" in the above structure is in the range of about 10,000 to about 20,000. In various embodiments, "n" is about 15,000.

In various embodiments, such a polyphosphazene can be advantageously employed as a corrosion inhibitor. Polar nitrogen compounds can adhere to metal wares and provide corrosion inhibitions. This polymer has multiple sites of attachment to a wellbore steel, such as N-80 steel or P-110 steel). In addition, the P and N of the polymer backbone are also expected to bond to metal.

A corrosion inhibitor "intensifier" is a chemical compound that itself does not inhibit corrosion, but enhances the effectiveness of a corrosion inhibitor over the effectiveness of the corrosion inhibitor without the corrosion inhibitor intensifier. For example, a corrosion inhibitor intensifier can be selected from the group consisting of: formic acid, potassium iodide, and any combination thereof.

In various embodiments a corrosion inhibitor intensifier is in a concentration of at least 0.1% by weight of the fluid. For example, the corrosion inhibitor intensifier can be in a concentration in the range of 0.1% to 20% by weight of the fluid.

Ionic Crosslinking of Polyphosphazene

In various embodiments, the polyphosphazene is not covalently crosslinked.

In various embodiments, the polyphosphazene is ionically crosslinked. However, covalently crosslinked would make molecule becomes too big to be soluble, etc.

In various embodiments, the ionic crosslinker is selected from the group consisting of divalent or polyvalent cations. For example, the ionic crosslinker can be selected from the group consisting of: calcium ($Ca^{+2}$), magnesium ($Mg^{+2}$), aluminum ($Al^{+3}$), ferrous ($Fe^{+2}$), manganese ($Mn^{+2}$), and zirconium ($Zr^{+4}$) cations.

Polyphosphazene Concentration

In various embodiments, the polyphosphazene is in a concentration of at least 0.1% by weight of the water. In various embodiments, the polyphosphazene is in a concentration of at least 1% by weight of the water. In various embodiments, the polyphosphazene is in a concentration of less than about 5% by weight of the water. In various embodiments, the polyphosphazene is in a concentration of less than about 3% by weight of the water. In various embodiments, the polyphosphazene is in a concentration of less than about 2% by weight of the water.

In various embodiments, at least some of the polyphosphazene is dissolved in the water of the fluid. In various embodiments, all of the concentration of the polyphosphazene is dissolved in the water of the fluid. In such an embodiment, for example, the polyphosphazene is not a solid particulate and is not of a solid encapsulated material.

Other Fluid Components

Water Sources

In various embodiments, the water is selected from the group consisting of: freshwater, brackish water, seawater, brine, produced water.

In various embodiments, the water of the fluid comprises dissolved water-soluble inorganic salts.

In various embodiments, the water-soluble inorganic salts are selected from the group consisting of: alkali metal halides and alkaline earth metal halides.

Water as Continuous Phase

In various embodiments, a continuous phase of the fluid comprises the water.

In various embodiments, the continuous phase is water-based.

Fluid as Suspension of a Particulate

In various embodiments, a fluid according to the disclosure comprises a solid particulate dispersed in fluid. In various embodiments, the solid particulate is selected from the group consisting of: density-increasing agents (e.g., barite), proppant, and gravel.

In various applications, the treatment fluid can include a proppant or gravel. Examples include sand, gravel, bauxite, ceramic materials, glass materials, polymer materials, wood, plant and vegetable matter, nut hulls, walnut hulls, cottonseed hulls, cured cement, fly ash, fibrous materials, composite particulates, hollow spheres or porous particulate.

In addition, particulate that has been chemically treated or coated can be used. For example, a proppant or gravel can be coated with a curable resin or tackifying agent. The term "coated" does not imply any particular degree of coverage of the particulates.

In various embodiments, resin or tackifying agent coated particulates may be suitable for use in the treatment fluids. Examples of tackifying agents that can be used for coating particulates are described in U.S. Pat. Nos. 5,853,048; 5,833,000; 5,582,249; 5,775,425; 5,787,986; 7,131,491; which are herein incorporated by reference. An example of a suitable commercially available tackifying agent is the "SANDWEDGE" product sold by Halliburton Energy Services, Inc. of Duncan, Okla. Examples of resins suitable for coating particulates are described in U.S. Pat. Nos. 6,668,926; 6,729,404; and 6,962,200. An example of a suitable commercially available resin is the "EXPEDITE" product sold by Halliburton Energy Services, Inc. of Duncan, Okla.

In various embodiments in which the treatment fluid comprises particulates, the treatment fluid may be capable of suspending at least a portion of the particulates contained therein. Treatment fluids comprising particulates may be used in any method known in the art that requires the placement of particulates in a subterranean formation. For example, treatment fluids that comprise particulates may be used, inter alia, to form a gravel pack in or adjacent to a portion of the subterranean formation.

Fluid as Emulsion

An emulsion is a fluid including a dispersion of immiscible liquid particles in an external liquid phase. In addition, the proportion of the external and internal phases is above the solubility of either in the other. A chemical can be included to reduce the interfacial tension between the two immiscible liquids to help with stability against coalescing of the internal liquid phase, in which case the chemical may be referred to as a surfactant or more particularly as an emulsifier or emulsifying agent.

In the context of an emulsion, a "water phase" refers to a phase of water or an aqueous solution and an "oil phase" refers to a phase of any non-polar, organic liquid that is immiscible with water, usually an oil.

An emulsion can be an oil-in-water (o/w) type or water-in-oil (w/o) type. A water-in-oil emulsion is sometimes referred to as an invert emulsion.

It should be understood that multiple emulsions are possible. These are sometimes referred to as nested emulsions. Multiple emulsions are complex polydispersed systems where both oil-in-water and water-in-oil emulsions exist simultaneously in the fluid, wherein the oil-in-water emulsion is stabilized by a lipophilic surfactant and the water-in-oil emulsion is stabilized by a hydrophilic surfactant. These include water-in-oil-in-water (w/o/w) and oil-in-water-in-oil (o/w/o) type multiple emulsions. Even more complex polydispersed systems are possible. Multiple emulsions can be formed, for example, by dispersing a water-in-oil emulsion in water or an aqueous solution, or by dispersing an oil-in-water emulsion in oil.

In various embodiments, a fluids according to the disclosure can be in the form of an emulsion.

In various embodiments, the external phase of the emulsion would be aqueous.

In various embodiments, the external phase of the emulsion would be oil.

In various embodiments, it may be desirable to use an emulsion to, inter alia, reduce fluid loss to the subterranean formation, or to provide enhanced particulate suspension. Other benefits and advantages to using emulsions for certain fluids and methods will be evident to one of ordinary skill in the art.

Fluid as Foamed

A foamed fluid is fluid having a liquid external phase that includes a dispersion of undissolved gas bubbles that foam the liquid, usually with the aid of a chemical (a foaming agent) in the liquid phase to achieve stability.

Any suitable gas may be used for foaming, including nitrogen, carbon dioxide, air, or methane. A foamed treatment fluid for use in a well may be desirable to, among other things, reduce the amount of fluid that is required in a water sensitive subterranean formation, to reduce fluid loss in the formation, or to provide enhanced proppant suspension. In examples of such embodiments, the gas may be present in the range of from about 5% to about 98% by volume of the treatment fluid, and more preferably in the range of from about 20% to about 80% by volume of the treatment fluid. The amount of gas to incorporate in the fluid may be affected by many factors including the viscosity of the fluid and the bottom hole temperatures and pressures involved in a particular application. One of ordinary skill in the art, with the benefit of this disclosure, will recognize how much gas, if any, to incorporate into a foamed treatment fluid.

Where it is desirable to foam a fluid, surfactants such as HY-CLEAN (HC-2) surface-active suspending agent or AQF-2 additive, both commercially available from Halliburton Energy Services, Inc., of Duncan, Okla., may be used. Additional examples of foaming agents that may be used to foam and stabilize the treatment fluids include, but are not limited to, betaines, amine oxides, methyl ester sulfonates, alkylamidobetaines such as cocoamidopropyl betaine, alpha-olefin sulfonate, trimethyltallowammonium chloride, C8 to C22 alkylethoxylate sulfate and trimethylcocoammonium chloride. Other suitable foaming agents and foam stabilizing agents may be included as well, which will be known to those skilled in the art with the benefit of this disclosure.

In various embodiments, a fluid according to the disclosure can be foamed (for example, a liquid that comprises an internal gas phase, such as nitrogen gas or carbon dioxide gas).

In various embodiments, it may desirable that the treatment fluid is foamed to, inter alia, reduce the amount of treatment fluid that is required, for example in water sensitive subterranean formations, to reduce fluid loss to the subterranean formation, enhance flow back of fluids, or to provide enhanced particulate suspension. In addition, in various embodiments where the treatment fluids are used for fluid diversion, it may be desirable that the treatment be foamed.

While various gases can be utilized for foaming the treatment fluids, nitrogen, carbon dioxide, and mixtures thereof are preferred. In examples of such embodiments, the gas may be present in a treatment fluid in an amount in the range of from about 5% to about 98% by volume of the treatment fluid, and more preferably in the range of from about 20% to about 80%. The amount of gas to incorporate into the fluid may be affected by factors including the viscosity of the fluid and wellhead pressures involved in a particular application.

Fluid not Supercritical

In various embodiments a fluid according to the disclosure does not contain a supercritical fluid, for example, does not contain supercritical carbon dioxide.

Other Fluid Additives

In various embodiments, the treatment fluids also can optionally comprise other commonly used fluid additives, such as those selected from the group consisting of surfactants, bactericides, conventional fluid-loss control additives, stabilizers, chelants, scale inhibitors, corrosion inhibitors, hydrate inhibitors, clay stabilizers, salt substitutes (such as tetramethyl or trimethyl ammonium chloride), relative permeability modifiers (such as HPT-1™ commercially available from Halliburton Energy Services, Duncan, Okla.), sulfide scavengers, fibers, nanoparticles, and any combinations thereof.

Surfactants

Surfactants are compounds that lower the surface tension of a liquid, the interfacial tension between two liquids, or that between a liquid and a solid, or that between a liquid and a gas. Surfactants may act as detergents, wetting agents, emulsifiers, foaming agents, and dispersants.

Surfactants are usually organic compounds that are amphiphilic, meaning they contain both hydrophobic groups ("tails") and hydrophilic groups ("heads"). Therefore, a surfactant contains both a water-insoluble (or oil soluble) portion and a water-soluble portion.

A surfactant can be or include a cationic, a zwitterionic, or a nonionic emulsifier. A surfactant package can include one or more different chemicals. As used herein, a surfactant does not mean or include a hydrophobic particulate.

In a water phase, surfactants form aggregates, such as micelles, where the hydrophobic tails form the core of the aggregate and the hydrophilic heads are in contact with the surrounding liquid. The aggregates can be formed in various shapes such as spherical or cylindrical micelles or bilayers. The shape of the aggregation depends upon various factors such as the chemical structure of the surfactant (for example, the balance of the sizes of the hydrophobic tail and hydrophilic head), the concentration of the surfactant, nature of counter ions, ionic salt concentration, co-surfactants, solubilized components (if any), pH, and temperature.

As used herein, the term micelle includes any structure that minimizes the contact between the lyophobic ("solvent-repelling") portion of a surfactant molecule and the solvent, for example, by aggregating the surfactant molecules into structures such as spheres, cylinders, or sheets, wherein the lyophobic portions are on the interior of the aggregate structure and the lyophilic ("solvent-attracting") portions are on the exterior of the structure. Micelles can function, among other purposes, to stabilize emulsions, break emulsions, stabilize a foam, change the wettability of a surface, or solubilize certain materials.

Emulsifiers

As used herein, an "emulsifier" refers to a type of surfactant that helps prevent the droplets of the dispersed phase of an emulsion from flocculating or coalescing in the emulsion.

In various embodiments, an emulsifier or emulsifier package can be in a concentration of at least 1% by weight of the water of the emulsion. In various embodiments, the emulsifier is in a concentration in the range of 1% to 10% by weight of the water.

The emulsion can also include other additives. For example, the emulsion can contain a freezing-point depressant. Typically, the freezing point depressant is for the water of the continuous phase. Preferably, the freezing-point depressant is selected from the group consisting of water-soluble ionic salts, alcohols, glycols, urea, and any combination thereof in any proportion.

The emulsion can also contain water-soluble salt(s) at a high-ionic strength for other purposes, for example, to increase the density of the continuous phase of the emulsion. In various embodiments, the water-soluble salt is selected from the group consisting of: an alkali metal halide, alkaline earth metal halide, alkali metal formate, and any combination thereof.

Methods of Drilling or Treating a Well with the Fluid

According to various embodiments of the disclosure, methods of treating a well are provided, the methods including the steps of: forming a drilling or treatment fluid according to the disclosure; and introducing the fluid into the well.

Forming Fluid

A fluid can be prepared at the job site, prepared at a plant or facility prior to use, or certain components of the fluid can be pre-mixed prior to use and then transported to the job site.

Certain components of the fluid may be provided as a "dry mix" to be combined with fluid or other components prior to or during introducing the fluid into the well.

In various embodiments, the preparation of a fluid can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

Introducing into Well or Zone

Often the step of delivering a fluid into a well is within a relatively short period after forming the fluid, for example, less within 30 minutes to one hour. In various embodiments, the step of delivering the fluid is immediately after the step of forming the fluid, which is "on the fly."

It should be understood that the step of delivering a fluid into a well can advantageously include the use of one or more fluid pumps.

Drilling

In various embodiments, the step of introducing the fluid into the well comprises: circulating the fluid in the well while drilling into the subterranean formation.

Introducing Below Fracture Pressure

In various embodiments, the step of introducing is at a rate and pressure below the fracture pressure of the treatment zone.

Introducing Above Fracture Pressure for Fracturing

Hydraulic fracturing is a common stimulation treatment. The purpose of a hydraulic fracturing treatment is to provide an improved flow path for oil or gas to flow from the hydrocarbon-bearing formation to the wellbore. In addition, a fracturing treatment can facilitate the flow of injected treatment fluids from the well into the formation. A treatment fluid adapted for this purpose is sometimes referred to as a fracturing fluid. The fracturing fluid is pumped at a sufficiently high flow rate and pressure into the wellbore and into the subterranean formation to create or enhance one or more fractures in the subterranean formation. Creating a fracture means making a new fracture in the formation. Enhancing a fracture means enlarging a pre-existing fracture in the formation.

"Breakdown pressure" is the pressure at which the rock matrix of subterranean formation fractures and allows a fluid to be injected. Hydraulic fracturing operations are conducted above the breakdown pressure, whereas matrix stimulation treatments are performed below the breakdown pressure.

A "breakdown fluid" can be introduced ahead of a fracturing treatment fluid. A suitable surfactant can act as a penetrating aid for a treatment fluid by lowering the pressure required to inject the fluid into the formation. For example, this reduction in pressure is achieved by increased matrix penetration of the breakdown fluid containing the breakdown surfactant, which allows for transmission of energy from the wellbore to the formation rock. A breakdown fluid is typically introduced below breakdown pressure before initiating hydraulic fracture in the formation.

A "pad fluid" is a fluid used to initiate hydraulic fracturing that does not contain proppant.

A frac pump is used for hydraulic fracturing. A frac pump is a high-pressure, high-volume pump. Typically, a frac pump is a positive-displacement reciprocating pump. The structure of such a pump is resistant to the effects of pumping abrasive fluids, and the pump is constructed of materials that are resistant to the effects of pumping corrosive fluids. Abrasive fluids are suspensions of hard, solid particulates, such as sand. Corrosive fluids include, for example, acids. The fracturing fluid may be pumped down into the wellbore at high rates and pressures, for example, at a flow rate in excess of 50 barrels per minute (2,100 U.S. gallons per minute) at a pressure in excess of 5,000 pounds per square inch ("psi"). The pump rate and pressure of the fracturing fluid may be even higher, for example, flow rates in excess of 100 barrels per minute and pressures in excess of 10,000 psi are often encountered.

Fracturing a subterranean formation often uses hundreds of thousands of gallons of fracturing fluid or more. Further, it is often desirable to fracture more than one treatment zone of a well. Therefore, a high volume of fracturing fluids is often used in fracturing of a well, which means that a low-cost fracturing fluid is desirable. Because of the ready availability and relative low cost of water compared to other liquids, among other considerations, a fracturing fluid is usually water-based.

The formation or extension of a fracture in hydraulic fracturing may initially occur suddenly. When this happens, the fracturing fluid suddenly has a fluid flow path through the fracture to flow more rapidly away from the wellbore. As soon as the fracture is created or enhanced, the sudden increase in the flow of fluid away from the well reduces the pressure in the well. Thus, the creation or enhancement of a fracture in the formation may be indicated by a sudden drop in fluid pressure, which can be observed at the wellhead. After initially breaking down the formation, the fracture may then propagate more slowly, at the same pressure or with little pressure increase. It can also be detected with seismic techniques.

A newly-created or newly-extended fracture will tend to close together after the pumping of the fracturing fluid is stopped. To prevent the fracture from closing, a material is usually placed in the fracture to keep the fracture propped open and to provide higher fluid conductivity than the matrix of the formation. A material used for this purpose is referred to as a proppant.

A proppant is in the form of a solid particulate, which can be suspended in the fracturing fluid, carried downhole, and deposited in the fracture to form a proppant pack. The proppant pack props the fracture in an open condition while allowing fluid flow through the permeability of the pack. The proppant pack in the fracture provides a higher-permeability flow path for the oil or gas to reach the wellbore compared to the permeability of the matrix of the surrounding subterranean formation. This higher-permeability flow path increases oil and gas production from the subterranean formation.

A particulate for use as a proppant is usually selected based on the characteristics of size range, crush strength, and solid stability in the types of fluids that are encountered or used in wells. Preferably, a proppant should not melt, dissolve, or otherwise degrade from the solid state under the downhole conditions.

The proppant is selected to be an appropriate size to prop open the fracture and bridge the fracture width expected to be created by the fracturing conditions and the fracturing fluid. If the proppant is too large, it will not easily pass into a fracture and will screenout too early. If the proppant is too small, it will not provide the fluid conductivity to enhance production. See, for example, W. J. McGuire and V. J. Sikora, "The Effect of Vertical Fractures on Well Productivity," *Trans.*, AIME (1960) 219, 401-403. In the case of fracturing relatively permeable or even tight-gas reservoirs, a proppant pack should provide higher permeability than the matrix of the formation. In the case of fracturing ultra-low permeable formations, such as shale formations, a proppant pack should provide for higher permeability than the naturally occurring fractures or other micro-fractures of the fracture complexity.

Appropriate sizes of particulate for use as a proppant are typically in the range from about 8 to about 100 U.S. Standard Mesh. A typical proppant is sand-sized, which geologically is defined as having a largest dimension ranging from about 0.06 millimeters up to about 2 millimeters (mm). (The next smaller particle size class below sand size is silt, which is defined as having a largest dimension ranging from less than about 0.06 mm down to about 0.004 mm.) As used herein, proppant does not mean or refer to suspended solids, silt, fines, or other types of insoluble solid particulate smaller than about 0.06 mm (about 230 U.S. Standard Mesh). Further, it does not mean or refer to particulates larger than about 3 mm (about 7 U.S. Standard Mesh).

The proppant is sufficiently strong, that is, has a sufficient compressive or crush resistance, to prop the fracture open without being deformed or crushed by the closure stress of the fracture in the subterranean formation. For example, for a proppant material that crushes under closure stress, a 20/40 mesh proppant preferably has an API crush strength of at least 4,000 psi closure stress based on 10% crush fines according to procedure API RP-56. A 12/20 mesh proppant material preferably has API crush strength of at least 4,000 psi closure stress based on 16% crush fines according to procedure API RP-56. This performance is that of a medium crush-strength proppant, whereas a very high crush-strength proppant would have a crush-strength of about 10,000 psi. In comparison, for example, a 100-mesh proppant material for use in an ultra-low permeable formation such as shale preferably has API crush strength of at least 5,000 psi closure stress based on 6% crush fines. The higher the closing pressure of the formation of the fracturing application, the higher the strength of proppant is needed. The closure stress depends on a number of factors known in the art, including the depth of the formation.

Further, a suitable proppant should be stable over time and not dissolve in fluids commonly encountered in a well environment. Preferably, a proppant material is selected that will not dissolve in water or crude oil.

Suitable proppant materials can include, but are not limited to, silica sand, ground nut shells, ground fruit pits, sintered bauxite, glass, plastics, ceramic materials, processed wood, composite materials, resin coated particulates, and any combination of the foregoing. Mixtures of different kinds or sizes of proppant can be used as well.

In conventional reservoirs, a proppant commonly has a median size anywhere within the range of about 20 to about 100 U.S. Standard Mesh. For a synthetic proppant, it commonly has a median size anywhere within the range of about 8 to about 100 U.S. Standard Mesh.

The concentration of proppant in the treatment fluid depends on the nature of the subterranean formation. As the nature of subterranean formations differs widely, the concentration of proppant in the treatment fluid may be in the range of from about 0.03 kilograms to about 12 kilograms of proppant per liter of liquid phase (from about 0.1 lb/gal to about 25 lb/gal).

In various embodiments, the step of introducing comprises introducing under conditions for fracturing a treatment zone. The fluid is introduced into the treatment zone at a rate and pressure that are at least sufficient to fracture the zone.

In various embodiments, the step of introducing into the portion of the well is at an estimated shear greater than 200/sec, or greater than 300/sec, or greater than 400/sec, or greater than 500/sec.

Introducing Via Hydrajet Tool

In various embodiments, the treatment fluids may be placed in a subterranean formation utilizing a hydrajet tool. The hydrajet tool may be capable of increasing or modifying the velocity or direction of the flow of a fluid into a subterranean formation from the velocity or direction of the flow of that fluid down a wellbore. One of the potential advantages of using a hydrajet tool is that a fluid may be introduced adjacent to and localized to specific areas of interest along the wellbore without the use of mechanical or chemical barriers. Some examples of suitable hydrajet tools are described in U.S. Pat. Nos. 5,765,642, 5,494,103, and 5,361,856, which are hereby incorporated by reference.

In various embodiments in which a hydrajet tool is used, the fluid(s) introduced through the hydrajet tool are introduced at a pressure sufficient to result in the creation of at least one new fracture in the formation. In one example of a hydrajetting operation carried out at an elevated pressure, a hydrajetting tool having at least one fluid jet forming nozzle is positioned adjacent to a formation to be fractured, and fluid is then jetted through the nozzle against the formation at a pressure sufficient to form a cavity, or slot therein to fracture the formation by stagnation pressure in the cavity. Because the jetted fluids would have to flow out of the slot in a direction generally opposite to the direction of the incoming jetted fluid, they are trapped in the slot and create a relatively high stagnation pressure at the tip of a cavity. This high stagnation pressure may cause a microfracture to be formed that extends a short distance into the formation. That micro-fracture may be further extended by pumping a fluid into the wellbore to raise the ambient fluid pressure exerted on the formation while the formation is being hydrajetted. Such a fluid in the wellbore will flow into the slot and fracture produced by the fluid jet and, if introduced into the wellbore at a sufficient rate and pressure, may be used to extend the fracture an additional distance from the wellbore into the formation.

Gravel Packing

Gravel packing is commonly used as a sand-control method to prevent production of formation sand or other fines from a poorly consolidated subterranean formation in a well. In this context, "fines" are tiny particles, typically having a diameter of 43 microns or smaller, that have a tendency to flow through the formation with the production of hydrocarbon. The fines have a tendency to plug small pore spaces in the formation and block the flow of oil. As all the hydrocarbon is flowing from a relatively large region around the wellbore toward a relatively small area around the wellbore, the fines have a tendency to become densely packed and screen out or plug the area immediately around the wellbore. Moreover, the fines are highly abrasive and can be damaging to pumping and oilfield other equipment and operations.

Placing a relatively larger particulate near the wellbore helps filter out the sand or fine particles and prevents them from flowing into the well with the produced fluids. The primary objective is to stabilize the formation while causing minimal impairment to well productivity.

The particulate used for this purpose is referred to as "gravel." In the oil and gas field, and as used herein, the term "gravel" is refers to relatively large particles in the sand size classification, that is, particles ranging in diameter from about 0.1 mm up to about 2 mm. Generally, a particulate having the properties, including chemical stability, of a low-strength proppant is used in gravel packing. An example of a commonly used gravel packing material is sand having an appropriate particulate size range. For various purposes, the gravel particulates also may be coated with certain types of materials, including resins, tackifying agents, and the like. For example, a tackifying agent can help with fines and resins can help to enhance conductivity (for example, fluid flow) through the gravel pack.

In a common type of gravel packing, a mechanical screen is placed in the wellbore and the surrounding annulus is packed with a particulate of a larger specific size designed to prevent the passage of formation sand or other fines. The screen holds back gravel during flow back. It is also common, for example, to gravel pack after a fracturing procedure, and such a combined procedure is sometimes referred to as a "frac-packing."

A screenout is a condition encountered during some gravel-pack operations wherein the treatment area cannot accept further packing gravel (larger sand). Under ideal conditions, this should signify that the entire void area has been successfully packed with the gravel. However, if screenout occurs earlier than expected in the treatment, it may indicate an incomplete treatment and the presence of undesirable voids within the treatment zone.

Like with placing a proppant in a subterranean formation during hydraulic fracturing, in gravel packing a viscosified fluid can be used to help transport and place the gravel in the well.

In various embodiments, the step of introducing comprises introducing under conditions for gravel packing the treatment zone.

Allowing Time for a Treatment in the Well

After a step of introducing a fluid according to the disclosure into a well, in various embodiments the methods include a step of allowing time for a treatment in the well. In various embodiments, this can include allowing time for breaking of a fluid viscosity of a treatment fluid according to the disclosure. This should occur with time under the conditions in the zone.

Flow Back Conditions

In various embodiments in a well, a step of flowing back is within 24 hours of the step of introducing. In some other various embodiments, the step of flowing back is within 16 hours of the step of introducing.

Producing Hydrocarbon from Subterranean Formation

In various embodiments, after any such use of a fluid in a well according to the disclosure, a step of producing hydrocarbon from the well or a particular zone is the desirable objective.

Example of a Well Operating Environment and System

FIG. 1 schematically illustrates an example of a well operating environment and well system. In the embodiment of FIG. 1, such an operating environment comprises a well site 100 including a wellbore 115 penetrating a subterranean formation 125 for the purpose of recovering hydrocarbons, storing hydrocarbons, disposing of carbon dioxide, injecting wellbore servicing fluids, or the like.

A surface wellbore fluid treatment (SWFT) system 110 for the treatment of a wellbore servicing fluid (WSF) or a component thereof (for example, water) can be deployed at the well site 100 and is fluidly coupled to the wellbore 115 via a wellhead 160.

The SWFT system 110 can be used, for example, to mix water with a water-soluble linear polyphosphazene to form a drilling fluid or a treatment fluid for use in the well.

The wellbore 115 can be drilled into the subterranean formation 125 using any suitable drilling technique. In an embodiment, a drilling or servicing rig 130 can generally comprise a derrick with a rig floor through which a tubular string 135 (for example, a drill string; a work string, such as a segmented tubing, coiled tubing, jointed pipe, or the like: a casing string; or combinations thereof) may be lowered into the wellbore 115.

A wellbore servicing apparatus 140 configured for one or more wellbore servicing operations (for example, a cementing or completion operation, a clean-out operation, a perforating operation, a fracturing operation, production of hydrocarbons, etc.) can be integrated with or at the end of the tubular string 135 for performing one or more wellbore servicing operations. For example, the wellbore servicing apparatus 140 may be configured to perform one or more servicing operations, for example, fracturing the formation 125, hydrajetting or perforating casing (when present) or the formation 125, expanding or extending a fluid path through or into the subterranean formation 125, producing hydrocarbons from the formation 125, or other servicing operation. In an embodiment, the wellbore servicing apparatus 140 may comprise one or more ports, apertures, nozzles, jets, windows, or combinations thereof suitable for the communication of fluid from a flowpath of the tubular string 135 or a flowpath of the wellbore servicing apparatus 140 to the subterranean formation 125. In an embodiment, the wellbore servicing apparatus 140 is actuatable (for example, openable or closable), for example, comprising a housing comprising a plurality of housing ports and a sleeve being movable with respect to the housing, the plurality of housing ports being selectively obstructed or unobstructed by the sliding sleeve so as to provide a fluid flowpath to or from the wellbore servicing apparatus 140 into the wellbore 115, the subterranean formation 125, or combinations thereof. In an embodiment, the wellbore servicing apparatus 140 may be configurable for the performance of multiple wellbore servicing operations.

Additional downhole tools can be included with or integrated within the wellbore servicing apparatus 140 or the tubular string 135, for example, one or more isolation devices 145 (for example, a packer, such as a swellable or mechanical packer) may be positioned within the wellbore 115 for the purpose of isolating a portion of the wellbore 115.

The drilling or servicing rig 130 can be conventional and can comprise a motor-driven winch and other associated equipment for lowering the tubular string 135 or wellbore servicing apparatus 140 into the wellbore 115. Alternatively, a mobile workover rig, a wellbore servicing unit (for example, coiled tubing units), or the like may be used to lower the tubular string 135 or wellbore servicing apparatus 140 into the wellbore 115 for performing a wellbore servicing operation.

The wellbore 115 may extend substantially vertically away from the earth's surface 150 over a vertical wellbore portion, or may deviate at any angle from the earth's surface 150 over a deviated or horizontal wellbore portion. Alternatively, portions or substantially all of the wellbore 115 may be vertical, deviated, horizontal, or curved.

In various embodiments, the tubular string 135 may comprise a casing string, a liner, a production tubing, coiled tubing, a drilling string, the like, or combinations thereof. The tubular string 135 may extend from the earth's surface 150 downward within the wellbore 115 to a predetermined or desirable depth, for example, such that the wellbore servicing apparatus 140 is positioned substantially proximate to a portion of the subterranean formation 125 to be serviced (for example, into which a fracture 170 is to be introduced).

In some instances, a portion of the tubular string 135 can be secured into position within the wellbore 115 in a conventional manner using cement 155; alternatively, the tubular string 135 may be partially cemented in wellbore 115; alternatively, the tubular string 135 may be uncemented in the wellbore 115.

In an embodiment, the tubular string 135 can comprise two or more concentrically positioned strings of pipe (for example, a first pipe string such as jointed pipe or coiled tubing may be positioned within a second pipe string such as casing cemented within the wellbore).

In an embodiment, the SWFT system 110 can be coupled to the wellhead 160 via a conduit 165, and the wellhead 160 may be connected (for example, fluidly) to the tubular string 135. Flow arrows 180 and 175 indicate a route of fluid communication from the SWFT system 110 to the wellhead 160 via conduit 165, from the wellhead 160 to the wellbore servicing apparatus 140 via tubular string 135, and from the wellbore servicing apparatus 140 into the wellbore 115 or into the subterranean formation 125 (for example, into fractures 170).

It should be understood, of course, that during production of fluid from the subterranean formation, the fluid flows in the reverse direction from the subterranean formation 125, through a wellbore servicing apparatus 140, through tubular string 135, to the wellhead 160, and out via a conduit, such as conduit 165, and beyond.

Although this may exemplify a given operating environment, the principles of the devices, systems, and methods disclosed can be similarly applicable in other operational environments, such as offshore or subsea wellbore applications.

Methods of Treating a Pipeline with the Fluid

According to various embodiments of the disclosure, methods of treating a well are provided, the methods including the steps of: forming a treatment fluid according to the disclosure; and introducing the fluid into the pipeline.

It should be understood that any of the disclosed polyphosphazenes can be used in a pipeline. In various embodiments, the treatment fluid comprises a polyphosphazene as described above regarding corrosion inhibition.

Like for treating a well, a fluid for use in a pipeline can be prepared at the job site, prepared at a plant or facility prior to use, or certain components of the fluid can be pre-mixed prior to use and then transported to the job site. Certain components of the fluid may be provided as a "dry mix" to be combined with fluid or other components prior to or during introducing the fluid into the pipeline.

In various embodiments, the preparation of a fluid can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

Often the step of delivering a fluid into a pipeline is within a relatively short period after forming the fluid, for example, less within 30 minutes to one hour. In various embodiments, the step of delivering the fluid is immediately after the step of forming the fluid, which is "on the fly."

It should be understood that the step of delivering a fluid into a pipeline can advantageously include the use of one or more fluid pumps.

After a step of introducing a fluid according to the disclosure into a pipeline, in various embodiments the methods include a step of allowing time for a treatment in the pipeline. In various embodiments, this can include allowing time for breaking of a fluid viscosity of a treatment fluid according to the disclosure. This should occur with time under the conditions in the portion of the pipeline being treated.

In various embodiments in a pipeline, a step of flowing through the portion of the pipeline or flowing back from the portion of the pipeline is within 24 hours of the step of introducing.

In various embodiments, after any such use of a fluid in a pipeline according to the disclosure, a step of using the pipeline for transportation of a fluid is the desirable objective.

CONCLUSION

Therefore, the present disclosure is well adapted to attain the ends and advantages mentioned as well as those that are inherent therein.

The exemplary polyphosphazenes disclosed herein may directly or indirectly affect one or more components or pieces of equipment associated with the preparation, delivery, recapture, recycling, reuse, or disposal of the disclosed polyphosphazenes. For example, the disclosed polyphosphazenes may directly or indirectly affect one or more mixers, related mixing equipment, mud pits, storage facilities or units, fluid separators, heat exchangers, sensors, gauges, pumps, compressors, and the like used generate, store, monitor, regulate, or recondition the exemplary polyphosphazenes. The disclosed polyphosphazenes may also directly or indirectly affect any transport or delivery equipment used to convey the polyphosphazenes to a well site or downhole such as, for example, any transport vessels, conduits, pipelines, trucks, tubulars, or pipes used to fluidically move the polyphosphazenes from one location to another, any pumps, compressors, or motors (for example, topside or downhole) used to drive the polyphosphazenes into motion, any valves or related joints used to regulate the pressure or flow rate of the polyphosphazenes, and any sensors (i.e., pressure and temperature), gauges, or combinations thereof, and the like. The disclosed polyphosphazenes may also directly or indirectly affect the various downhole equipment and tools that may come into contact with the chemicals/fluids such as, but not limited to, drill string, coiled tubing, drill pipe, drill collars, mud motors, downhole motors or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

The particular embodiments disclosed above are illustrative only, as the present disclosure may be modified and practiced in different but equivalent manners apparent to those skilled in the art having the benefit of the teachings herein. It is, therefore, evident that the particular illustrative embodiments disclosed above may be altered or modified and all such variations are considered within the scope of the present disclosure.

The various elements or steps according to the disclosed elements or steps can be combined advantageously or practiced together in various combinations or sub-combinations of elements or sequences of steps to increase the efficiency and benefits that can be obtained from the disclosure.

It will be appreciated that any one or more of the above embodiments may be combined with any one or more other embodiments, unless explicitly stated otherwise.

The illustrative disclosure can be practiced in the absence of any element or step that is not specifically disclosed or claimed.

Furthermore, no limitations are intended to the details of construction, composition, design, or steps herein shown, other than as described in the claims.

What is claimed is:

1. A method of drilling a wellbore into a subterranean formation or of treating a treatment zone along a wellbore penetrating a subterranean formation, the method comprising:
   (A) forming a fluid, the fluid comprising:
      (i) water; and
      (ii) a water-soluble linear polyphosphazene; and
   (B) introducing the fluid into the wellbore;
   wherein (a) the water-soluble polyphosphazene is at least 90% by weight stable, (b) the water-soluble polyphosphazene is at least 90% by weight non-degradable, (c) the water-soluble polyphosphazene comprises a plurality of functional groups, at least 90% of which are non-hydrolyzable, or combinations thereof.

2. The method according to claim 1, wherein the fluid additionally comprises: more than one water-soluble linear polyphosphazene.

3. The method according to claim 1, wherein the polyphosphazene is at least 2% by weight soluble in deionized water.

4. The method according to claim 1, wherein the polyphosphazene has a chain length in the range of 1,000 to about 100,000 monomeric units.

5. The method according to claim 1, wherein the polyphosphazene is of the type that can be formed by a reaction between a poly(dichloropolyphosphazene) and at least one other molecule to form at least one type of a substituent for the chlorine of the poly(dichlorpolyphosophazene).

6. The method according to claim 5, wherein the other molecule is selected from the group consisting of: a molecule having at least one —OH group or —O⁻M⁺ group, where M is a alkali metal cation.

7. The method according to claim 5, wherein the other molecule is a polymer oxide.

8. The method according to claim 7, wherein the chain length of the polymer oxide is in the range of about 20 to about 100.

9. The method according to claim 5, wherein the other molecule is selected from the group consisting of: a molecule having a least one primary or secondary amine group.

10. The method according to claim 9, wherein the other molecule is selected from the group consisting of: poly primary amines and poly secondary amines.

11. The method according to claim 1, wherein the polyphosphazene is:

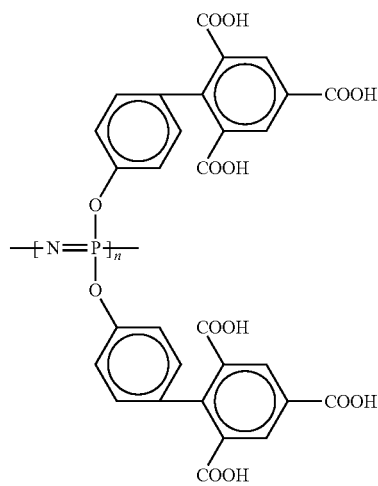

wherein n is in the range of about 10,000 to about 20,000.

12. The method according to claim 1, wherein the polyphosphazene is:

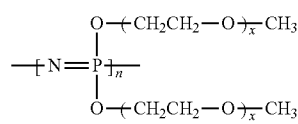

wherein "x" can vary or be anywhere is in the range of about 20 to about 100 wherein n is in the range of about 10,000 to about 20,000.

13. The method according to claim 1, wherein the polyphosphazene is:

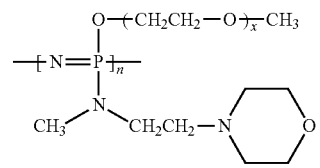

wherein "x" is in the range of about 1 to about 10 wherein n is in the range of about 10,000 to about 20,000.

14. The method according to claim 1, wherein the polyphosphazene is:

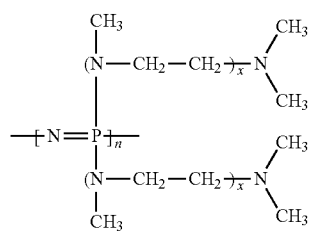

wherein "x" is in the range of 1 to 5 wherein n is in the range of about 1,000 to about 8,000.

15. The method according to claim 1, wherein the polyphosphazene is:

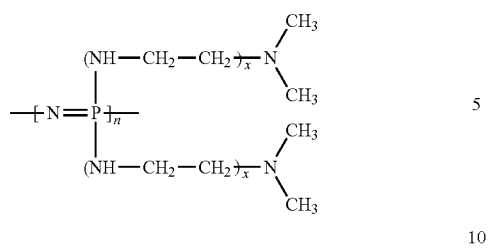
wherein "x" is in the range of 1 to 5 wherein n is in the range of about 10,000 to about 20,000.
16. The method according to claim 1, wherein the polyphosphazene is ionically crosslinked.
* * * * *